May 12, 1959     J. K. SHANNON     2,886,622
BATTERY COVER
Filed May 16, 1955     2 Sheets-Sheet 1
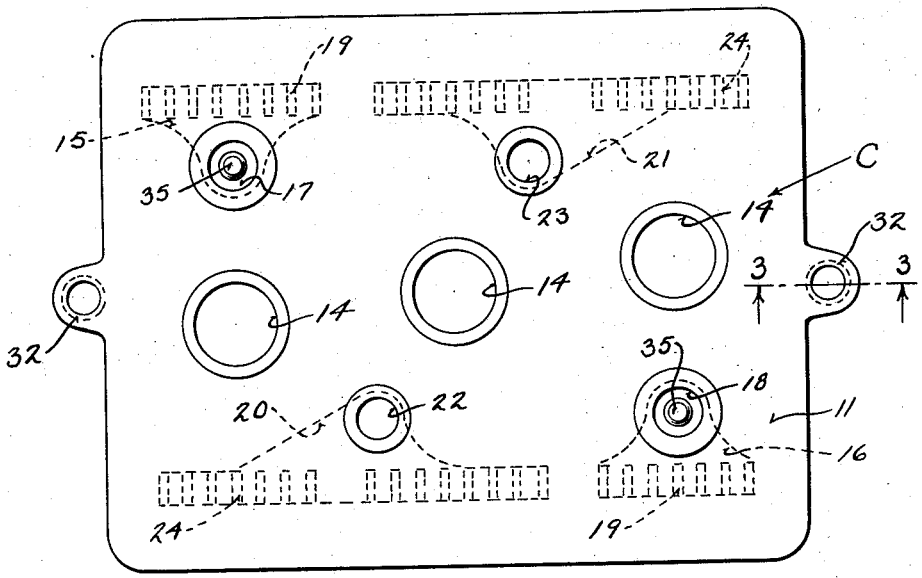
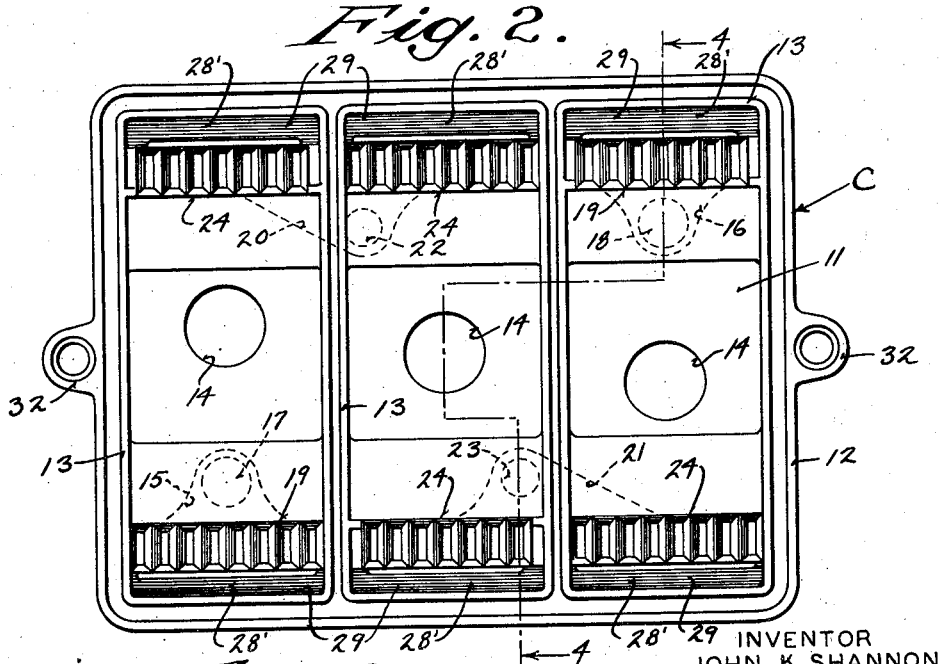
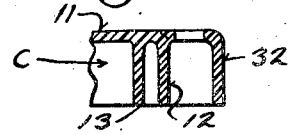
INVENTOR
JOHN K. SHANNON
BY
Young & Wright
ATTORNEYS May 12, 1959     J. K. SHANNON     2,886,622
BATTERY COVER Filed May 16, 1955     2 Sheets-Sheet 2

INVENTOR
JOHN K. SHANNON

BY

ATTORNEYS

United States Patent Office 2,886,622
Patented May 12, 1959

2,886,622

BATTERY COVER

John K. Shannon, Kenosha, Wis.

Application May 16, 1955, Serial No. 508,410

3 Claims. (Cl. 136—170)

This invention appertains to covers for storage batteries of the type shown in the prior Patents Nos. 2,618,673, issued November 18, 1952, and 2,737,542, issued March 6, 1956, entitled "Storage Battery Cover."

The primary object of this present invention is to improve the general construction of storage battery cell covers and more particularly to improve the construction shown in the above-mentioned patents.

In the prior patents, I have shown battery cell covers provided with cavities for receiving molten metal to effectively join the battery plate lugs, to form inter-cell connector straps and terminal post connector straps for the plates.

It is one of the salient objects of this invention to provide novel means on the cover for receiving the molten metal, whereby such hot metal will initially flow against and around the plate lugs, to effectively reduce the lug terminals to a molten condition, and thus insure the proper fusing of the lugs with the incoming molten metal to form the lug shoulders and connector straps.

Another important object of the invention is to form the under side of the cover with longitudinally extending pouring openings arranged directly adjacent to the ways for receiving the plate lugs, with the openings having guide walls inclining toward said ways, whereby the molten metal, upon being poured into said openings, will immediately flow toward and around the lugs.

A further feature of the new cover is that the vertical plate lug receiving ways will not require individual, equidistantly spaced vertical receiving ways for each plate lug, but can be one continuous vertical receiving way to accommodate the desired number of plate lugs on the negative side of the cell and a continuous vertical receiving way to accommodate the plate lugs of the positive side of the cell.

A still further object of the invention is to so form the cover that only the terminal post (if desired) need project from the top surface of the cover body, the cover being so formed that the intercell connectors can terminate or have a terminus on the top surface of the cover or the inter-cell connectors can be formed within the interior mold cavities of the cover without a terminus on the upper surface of the cover.

A still further important object of the invention is the provision of weakened points on the cover at the terminus of the inter-cell connectors so that the cover can be ruptured at such points to permit individual testing of the cells when necessary or desirable.

Still another object of the invention is to provide means on the cover at the terminal post for reducing the area of metal to form a weak point, whereby in effect to provide a fuse link, so that if an unusual condition arises where the metal is affected by heat from excessive current conditions, such conditions will take place in the terminal post instead of in the interior cavities, whereby repairs can easily be made to the battery from the outside of the cover.

With these and other objects in view, the invention consists in the novel construction, arrangement and formation of parts, as will be hereinafter more specifically described and claimed, and illustrated in the accompanying drawing, in which drawing, Figure 1 is a top plan view of the cover prior to the association of the battery plates therewith and prior to the introduction of molten metal into the interior cavities of the cover;

Figure 2 is a bottom plan view of the cover prior to the assembly of the battery plates therein and prior to the introduction of the molten metal in the cover;

Figure 3 is a fragmentary detail vertical sectional view through one end of the cover taken on the line 3—3 of Figure 1, looking in the direction of the arrows and illustrating more particularly the opening for a hold-down bolt;

Figure 4:
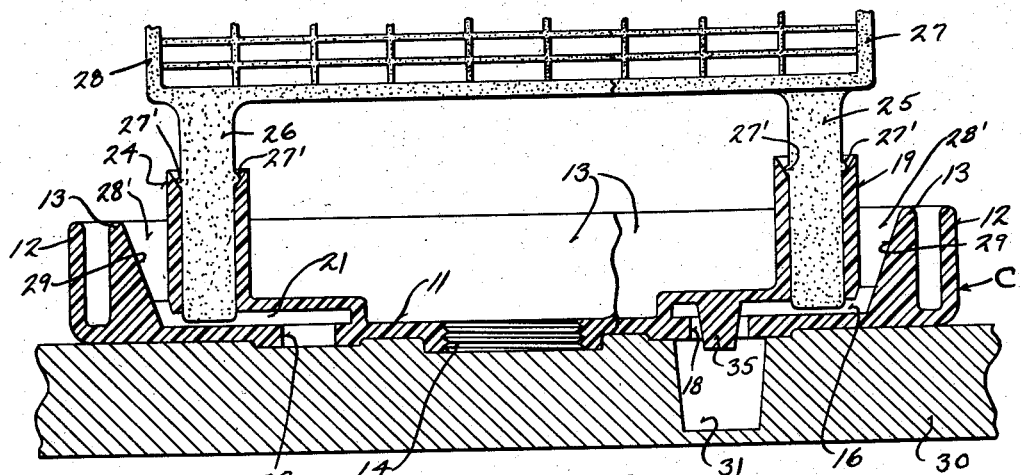
Figure 4 is a transverse sectional view through the cover showing the same in its inverted position and on top of a mold plate and with battery plates associated therewith, the section through the cover being taken on the line 4—4 of Figure 2, looking in the direction of the arrows.

Referring to the drawings in detail, wherein similar reference characters designate corresponding parts throughout the several views, the letter C generally indicates the improved cover which is formed from a dielectric material, preferably a thermoplastic, such as polystyrene. The cover C includes a substantially flat body 11 having formed on its lower surface at its marginal edge a depending skirt 12 for fitting around the outer surface of a battery case (not shown). Also formed on the lower surface of the body 11 are depending rectangular shaped skirts 13 for fitting snugly within the individual cells of the battery. In the present showing, the cover is adapted to be associated with a battery having three cells, but obviously, the number of cells is immaterial. As is usual, the body plate is provided with filling necks 14 to permit the introduction of water and electrolyte into the individual cells of the battery, and these necks are normally closed by caps (not shown).

The end cell portions of the cover C are provided with interior cavities 15 and 16 at the opposite diagonal corners of the cover, and these cavities communicate with openings 17 and 18 respectively, for the terminal post of the battery. The openings 17 and 18, of course, open out through the upper surface of the cover and the cover can be reinforced around the openings by annular rims or collars. Communicating with the cavities 15 and 16 at one side of the openings 17 and 18 through the lower surface of the cover are vertical ways 19. The cover C also has formed therein interior cavities 20 and 21 and these cavities are of such a length as to bridge adjacent cells of the battery, so that inter-cell connector straps will be formed, as will later appear. The cavities 20 and 21 have communicating therewith openings 22 and 23, respectively, which open out through the upper surface of the cover and which form the terminus for intermediate cells, as will also later appear for testing purposes. Also communicating with the cavities 20 and 21 at one side of the openings 22 and 23, through the lower facing of the cover are vertically extending ways 24. The ways 19 and 24 receive plate lugs 25 and 26, of the negative and positive sets 27 and 28 of battery plates for the cells, and it is to be understood that the plates of the sets are separated by any preferred type of separators (not shown). The lugs 25 and 26 are of such a length as to extend into the cavities 15, 16, 20 and 21, and in order to limit the insertion of the lugs into the cavities, the lugs are provided with laterally extending nibs 27' for engaging the walls of the lug receiving ways 19 and 24 and these nibs form stops. In Figures 1 and 2, I have shown individual ways for receiving the plate lugs, but in accordance with the present invention, these ways can be continuous, that is, one continuous vertical way can be provided to accommodate the desired number of plate lugs on the negative side of the cell, and a continuous vertical receiving way to accommodate the desired number of plate lugs on the positive side of a cell.

As brought out in the objects, one of the salient features of the invention resides in the means on the cover for initially receiving the molten metal, and I provide pouring openings 28' on the inner face of the cover at the outer sides of the ways 19 and 24. These openings 28' are arranged in spaced parallel relation to the adjacent ways and open into the cavities 15, 16, 20 and 21. It is to be noted that the outer walls of the openings 28' incline downwardly and inwardly, as at 29, toward the cavities and hence when metal is poured into the openings the metal will be guided by the inclined walls directly into the cavities toward and around the terminals of the plate lugs 25 and 26.

During the assembly of the battery the cover C is placed in an inverted position on a mold plate 30, and this mold plate at desired points can be provided with terminal post cavities 31 so that the terminal post openings 17 and 18 will communicate therewith. The sets of battery plates are now assembled and the plate lugs 25 and 26 are inserted in the correct ways 19 and 24 with the terminals thereof projecting into the interior cavities. Molten metal is now poured into the openings 28' and the metal will flow toward and around the terminals of the plate lugs into the cavities and into the terminal cavities 31 and the openings 22 and 23 which are closed by the plate 30. The molten metal joining with the plate lug terminals, when solidified, forms the plate shoulders, the intercell connector straps, the connector straps for the battery terminals and the battery terminals themselves, as well as terminus for the cells for testing purposes. This forms a rugged construction and a leakproof battery cell cover and plate assembly.

The cover C at its opposite ends can be provided with any preferred type of ears 32 having openings therein for receiving hold-down bolts (not shown) utilized for securing the battery in place on an automotive vehicle or other desired place.

Figure 6:
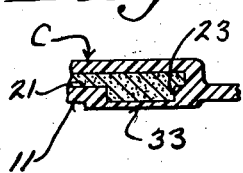
Figure 6 is a detail fragmentary vertical sectional view through a slightly modified form of cover and showing the terminus of a cell completely embedded in the cover.
Figure 7:
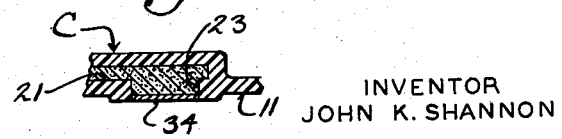
Figure 7 is a view similar to Figure 6, but showing the terminus of a cell covered by a removable or frangible disc.

If preferred, and as shown in Figure 6 the openings 22 and 23 can be closed by a thin wall 33 so that no metal will be protruding from the cover at all, with the exception of the battery terminal posts. This wall 33 can be ruptured, if it becomes necessary to test the various cells of the battery. In lieu of the wall 33, the openings 23 and 22 can be closed by a disc 34, as shown in Figure 7 of the drawing.

The entire cover, itself, can be molded in various manners, such as is suggested in the patent and patent application heretofore mentioned.

Figure 5:
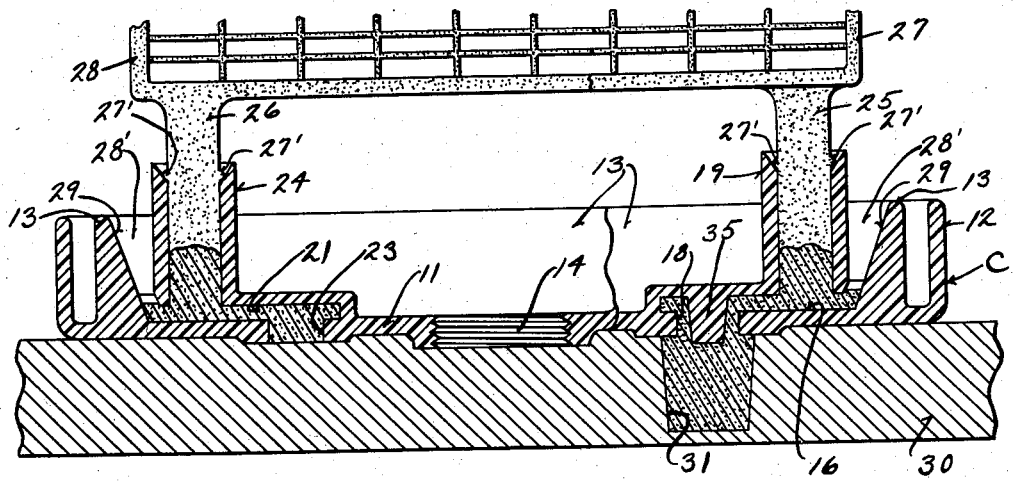
Figure 5 is a view similar to Figure 4, but showing the molten metal introduced into the interior cavities.

In view of the fact that the battery strap connectors, etc., are completely enclosed within the cover C, it is desirable to provide a weak point in the connectors which will be easily accessible from the outside of the cover. Under some abnormal conditions heavy current tends to rupture the connectors. To provide an accessible weak point, I preferably mold on the lower wall of the cavities 15 and 16 studs 35 which project through the terminal post openings 17 and 18. This reduces the area of these openings and as best shown in Figure 5, the lead at these points is comparatively thin and these thin points form in effect a fuse link. Hence, the metal will rupture at this point when a certain abnormal condition exists.

Various changes in details may be made without departing from the spirit or the scope of this invention, but what is claimed as new is:

1. A unitary cover for the case of a storage battery comprising an integral body formed from dielectric material having enclosed interior cavities for the reception of molten metal for forming shoulders for the lugs of battery plates and connector straps for the cells of the battery, the cover also having openings communicating with the cavities for molten metal to form terminal posts and terminus for an intermediate battery cell, guideways on the inner face of the cover communicating with the cavities for receiving plate lugs, said cover having pouring openings on its inner face arranged in spaced parallel relation to the guideways and adjacent to said guideways communicating with the cavities, said pouring openings having inclined walls leading toward the cavities and the guideways, and integral studs formed on the walls of said cavities adjacent said point of lug formation and extending through the openings for terminal post.

2. A unitary cover for the case of a storage battery comprising an integral body formed from dielectric material having enclosed interior cavities for the reception of molten metal for forming shoulders for the lugs of battery plates and connector straps for the cells of the battery, the cover also having openings communicating with the cavities for molten metal to form terminal posts and terminus for an intermediate battery cell, guideways on the inner face of the cover communicating with the cavities for receiving plate lugs, said cover having pouring openings on its inner face arranged in spaced parallel relation to the guideways and adjacent to said guideways communicating with the cavities, said pouring openings having inclined walls leading toward the cavities and the guideways, integral studs formed on the walls of said cavities adjacent said point of lug formation and extending through the openings for terminal post, and thin frangible walls covering the outer ends of the openings for intermediate cell terminus.

3. A unitary cover for the case of a storage battery as defined in claim 1, and laterally extending hold down ears formed on the body.

References Cited in the file of this patent

UNITED STATES PATENTS

| | | |
|---|---|---|
| 2,618,673 | Shannon et al. | Nov. 18, 1952 |
| 2,637,759 | Shannon | May 5, 1953 |